US006859860B2

(12) United States Patent
Saito et al.

(10) Patent No.: US 6,859,860 B2
(45) Date of Patent: Feb. 22, 2005

(54) CONTROL CIRCUITS COMPARING INDEX OFFSET AND WAY FOR CACHE SYSTEM AND METHOD OF CONTROLLING CACHE SYSTEM

(75) Inventors: Yasuhiko Saito, Tokyo (JP); Kazunori Miyamoto, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 48 days.

(21) Appl. No.: 10/058,771

(22) Filed: Jan. 30, 2002

(65) Prior Publication Data

US 2002/0103971 A1 Aug. 1, 2002

(30) Foreign Application Priority Data

Jan. 30, 2001 (JP) ........................................ 2001-022210

(51) Int. Cl.[7] .............................................. G06F 12/00
(52) U.S. Cl. ...................................... 711/118; 711/167
(58) Field of Search ................................ 711/118, 133, 711/159, 167, 168

(56) References Cited

U.S. PATENT DOCUMENTS

| | | | | | |
|---|---|---|---|---|---|
| 5,765,035 | A | * | 6/1998 | Tran | 712/216 |
| 5,848,287 | A | * | 12/1998 | Tran et al. | 712/23 |
| 6,192,462 | B1 | * | 2/2001 | Tran et al. | 712/23 |
| 6,363,470 | B1 | * | 3/2002 | Laurenti et al. | 711/220 |
| 6,433,787 | B1 | * | 8/2002 | Murphy | 345/556 |
| 6,662,280 | B1 | * | 12/2003 | Hughes | 711/156 |

FOREIGN PATENT DOCUMENTS

| | | |
|---|---|---|
| JP | 9-114734 | 12/1998 |
| JP | 2000 181780 | 6/2000 |

* cited by examiner

*Primary Examiner*—Kevin Verbrugge
(74) *Attorney, Agent, or Firm*—Young & Thompson

(57) ABSTRACT

A circuit for controlling a cache system having a store queue having plural stages for storing store instructions. The circuit includes: a first comparator circuit for comparing, in view of index and off-set, an instruction with tag-retrieval to the store instructions stored in the store queue; and a stalling circuit for selectively stalling the instruction with tag-retrieval if the instruction with tag-retrieval corresponds, in view of not only index but also off-set, to at least one of the store instructions.

14 Claims, 14 Drawing Sheets

FIG. 1    prior art

①  Load   r8,   0x1000
②  Load   r9,   0x1500
③  Store  r10,  0x1760
④  Load   r11,  0x1840   } the same address
⑤  Load   r12,  0x1760 instructions (1), (2) and (4) : no dependency : replaceable instructions (3) and (5) : dependency : the order (3) → (5)

examples of replacing

|   |   |   | object way | way index "00" way 0 / way 1 | result |
|---|---|---|---|---|---|
| a | ① Store | tag-retrieval : miss | 0 | indefinite \| 8 | 0 |
| b |   | replace | 0 | 4 \| 8 | 0 |
| c | ② Store | tag-retrieval : hit | 1 | 4 \| 8 | 0 |
| d | ③ Load | tag-retrieval : miss | 0 | 4 \| 8 | 1 |
| e | ① Store | write | 0 | 4 \| 8 | 1 |
| f | replace (write-back + refill) |   | 0 | C \| 8 | 0 |

FIG. 14A

① Store r15, 0x4000
② Load r17, 0x4000

FIG. 14B

① Store r15, 0x4000
② Load r17, 0x8000

FIG. 15A

① Store   r15,   0x4000
② Load    r17,   0x4128

FIG. 15B

① Store   r15,   0x4000  ⟶ way 0
② Store   r16,   0x8000  ⟶ way 1
③ Load    r17,   0xC004  ⟶ way 0

CONTROL CIRCUITS COMPARING INDEX OFFSET AND WAY FOR CACHE SYSTEM AND METHOD OF CONTROLLING CACHE SYSTEM

BACKGROUND OF THE INVENTION

1. Field of the Invention

The present invention relates to a control circuit for controlling a cache system, and more particularly to a cache system control circuit having a store queue for temporary storing a store instruction and being capable of re-ordering the instructions.

2. Description of the Related Art

A semiconductor device may include a data cache or a data cache system and a store queue serving as a write buffer or a store buffer for data-write instruction or data store instruction. Data write operation to a main memory and data cache operation to a data memory may be made, wherein a store instruction including a write address and data is once held by the store queue for improvement in throughput of the processor. Those conventional techniques are disclosed in Japanese laid-open patent publications Nos. 9-114734 entitled "store buffer device", and also in Japanese laid-open patent publications Nos. 2000-181780 entitled "store buffer device". The word "data cache system" is defined to be a data cache system which comprises a tag memory and a data memory.

The semiconductor device using the store queue may perform an instruction re-order which changes the original order or sequence of plural instructions. One example of the instruction re-order is that a tag-retrieved store instruction is stored in the store queue for executing a subsequent load instruction for reading data from the data memory or the main memory prior to storing the store instruction to the memory, thereby improving the efficiency of accesses to the data memory and the main memory.

It is, however, essential for the instruction re-order to keep or ensure the dependency relationship of data which are accessed. It is assumed that the original instruction order that is a store instruction to an address is executed, before a load instruction from the same address is then executed. If the instruction re-order is made so that the store instruction to the same address is executed after the load instruction from the same address has been executed, then the actually loaded data are not the necessary data which should be loaded.

FIG. 1 is a view illustrative of original instruction order and examples of available instruction re-ordering. An instruction (1) is a load instruction for loading data from an address "1000" represented in hexadecimal digits and the loaded data are then transferred to a register "r8". An instruction (2) is a load instruction for loading data from address "1500" represented in hexadecimal digits and the loaded data are then transferred to a register "r9". An instruction (3) is a store instruction for storing data into an address "1760" represented in hexadecimal digits, wherein the data have been stored in a register "r10". An instruction (4) is a load instruction for loading data from an address "1840" represented in hexadecimal digits and the loaded data are then transferred to a register "r11". An instruction (5) is a load instruction for loading data from the same address "1760" as the store instruction (3) and the loaded data are then transferred to a register "r12".

There are no address dependency among the load instruction (1), the load instruction (2), and the load instruction (4) because those instructions have different addresses from each other. However, the store instruction (3) and the load instruction (5) have the same address, for which reason the address dependency exists, wherein the original instruction order should be ensured. Therefore, the instruction re-order should ensure that the store instruction (3) has been executed before the load instruction (5) is executed. Namely, any instruction re-orders may be available unless the store instruction (3) is executed after the load instruction (5) has been executed. One example of the available instruction re-order is the store instruction (3), the load instruction (1), the load instruction (2), and the load instruction (4) and the load instruction (5). Other example is that the load instruction (1), the load instruction (2), and the load instruction (4), the store instruction (3) and the load instruction (5). It may preferably take a longer time interval between the store instruction (3) and the load instruction (5) for shortening the total necessary time for executing all of the above five instructions.

A conventional structure for controlling the instruction re-order for ensuring the address dependency and a conventional operation thereof will subsequently be described with reference to the drawings. FIG. 2 is a block diagram illustrative of a conventional circuit configuration for detecting the presence of dependency. FIG. 3 is a diagram illustrative of an address data configuration for access to the main memory or the data memory. FIG. 4 is a block diagram illustrative of a fragmentary data cache structure including a tag memory and a data memory in one-way. FIG. 5 is a flow chart of sequential processes in accordance with instructions with the needs to retrieve tags for using data caches thereof, in connection with the structure of FIG. 2. The retrieval to the tags are needed to utilize the data caches of the load instruction, a prefetch instruction, and the store instruction. The retrieval to the tags is a retrieval for retrieving whether page frame numbers at addresses for the load instruction, the prefetch instruction, and the store instruction are stored in the tag memory of the data cache.

As shown in FIG. 3, the address signal comprises a page frame number (tag) of predetermined higher significant bits, an index of predetermined intermediate significant bits and an offset of predetermined lower significant bits. As shown in FIG. 4, the data cache comprises a tag memory 104 and a data memory 105. The tag memory 104 has plural memory areas with indexes "0", "1", "2", "3", - - - "M−1" for storing respective page frame numbers allocated to indexes thereof as well as storing plural bit data for storing other states not illustrated. The data memory 105 is divided into plural data areas with indexes "0", "1", "2", "3", - - - "M−1" which correspond to the memory areas of the tag memory 104. Each of the divided plural data areas is further divided into plural data sub-areas which may be designated by offset values.

With reference back to FIG. 2, the detection of the presence of the address dependency is executed by comparison of indexes of the addresses shown in FIG. 3. A store queue 101 for temporary storing the store instructions has four stages. It is assumed that the instruction with the tag-retrieval is intended to be executed, wherein this instruction has an index "B". A comparator group 102 includes four comparators (0), (1), (2) and (3). The four comparators (0), (1), (2) and (3) respectively compare the four indexes "A0", "A1", "A2" and "A3" stored in the store queue 101 to the index "B" of the above instruction with the tag-retrieval. Respective results of the four comparators (0), (1), (2) and (3) are then subjected to logical OR-operation by an OR-gate 103, thereby corresponding one of the four indexes "A0", "A1", "A2" and "A3" to the index "B" can be retrieved.

As shown in FIG. 5, the sequential processes for the above instruction with the tag-retrieval will be described. In the step S101, comparisons are made between the retrieval-object index and all of the indexes of the store instructions stored in the store queue 101. If at least one of the indexes of the store instructions stored in the store queue 101 corresponds to the retrieval-object index, then the store instruction with the corresponding index to the retrieval-object index is executed in the step S102. The above comparisons are again made in the step S101. If none of the indexes of the store instructions stored in the store queue 101 correspond to the retrieval-object index, then the tag retrieval is executed to the object instruction in the step S103, wherein it is verified whether or not the page frame number of the object instruction has been stored in the retrieval-object index of the tag memory 104. If the page frame number of the object instruction has been stored in the retrieval-object index, then the process enters into the subsequent processes in the step S105. If the page frame number of the object instruction has not yet been stored in the retrieval-object index, then a replace process is executed to the indexes of the tag memory 104 in the step S104, followed by the subsequent processes in the step S105.

The above replace process is to update the contents of the tag memory 104 and the data memory 105 of the data cache upon updating the page frame number. The updating process may be classified into two types depending on the issue of whether or not the contents of the date memory 105 should be written back to the main memory. If, for example, data loaded from the main memory to the data memory 105 have not been updated at the updating time, then it is unnecessary to write these data back to the main memory. It is merely necessary that data corresponding to the newly set page frame number are loaded from the main memory to the corresponding index area of the data memory 105. This simple data load process without the data write-back is so called to as "refill operation".

If the data are written back to the main memory before new data corresponding to the newly set page frame number are loaded from the main memory to corresponding index of the data memory 105, then those sequential processes are so called "write-back-and-refill operation". The replace operation or the replace process is defined to include both the "refill operation" and the "write-back operation". The expression "replace operation" means either the "refill operation" or the "write-back-and-refill operation".

In the step S102, the object instruction is stalled until execution of the store instruction in the store queue has been completed. As described above, in accordance with the conventional technique, the comparison with reference to only the indexes are executed before the retrieval of the tag, for which reason if correspondence of at least one index can be confirmed, the store instruction become stalled. Even if the index correspondence can be confirmed between the store instruction with the tag-retrieval and the store instruction in the store queue, then it is possible that an off-set is different between the store instruction with the tag-retrieval and the store instruction in the store queue. If the off-set is different between those store instructions, this means that the addresses for those store instructions are different, and accordingly no address dependency is present between those store instructions. Notwithstanding, the conventional technique makes the store instruction stalled even if there is no address dependency. These unnecessary stalls of the instructions increase the probability of generating the stall state, thereby making it difficult to realize an efficient instruction re-order operation.

In the above circumstances, the development of a novel cache system control circuit free from the above problems is desirable.

SUMMARY OF THE INVENTION

Accordingly, it is an object of the present invention to provide a novel cache system control circuit free from the above problems.

It is a further object of the present invention to provide a novel cache system control circuit capable of promoting the instruction re-order with a possible avoidance to the unnecessary stall of the store instruction.

It is a still further object of the present invention to provide a novel cache system control circuit capable of enhancing the throughput and performance of the microprocessor.

The present invention provides a circuit for controlling a cache system having a store queue having plural stages for storing store instructions. The circuit includes: a first comparator circuit for comparing, in view of index and off-set, an instruction with tag-retrieval to the store instructions stored in the store queue; and a stalling circuit for selectively stalling the instruction with tag-retrieval if the instruction with tag-retrieval corresponds, in view of not only index but also off-set, to at least one of the store instructions.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 1 is a view illustrative of original instruction order and examples of available instruction re-ordering.

FIG. 13 is a view illustrative of operations upon input of the instruction sequence of FIG. 12.

FIG. 14A is a view illustrative of examples of the instructions which are stalled by comparison of the index and off-set, wherein there is a data dependency with correspondences in index, off-set and page frame number.

FIG. 14B is a view illustrative of examples of the instructions which are stalled by comparison of the index and off-set, wherein there is no data dependency with correspondences in index, off-set and page frame number.

FIG. 15A is a view illustrative of examples of the instructions which are not stalled by comparison of the index and off-set, wherein there is no correspondence in index.

FIG. 15B is a view illustrative of examples of the instructions which are not stalled by comparison of the index and off-set, wherein there is correspondence in index and no correspondence in off-set, (store queue hit may be possible)

DETAILED DESCRIPTION OF THE PREFERRED EMBODIMENTS

Figure 2:
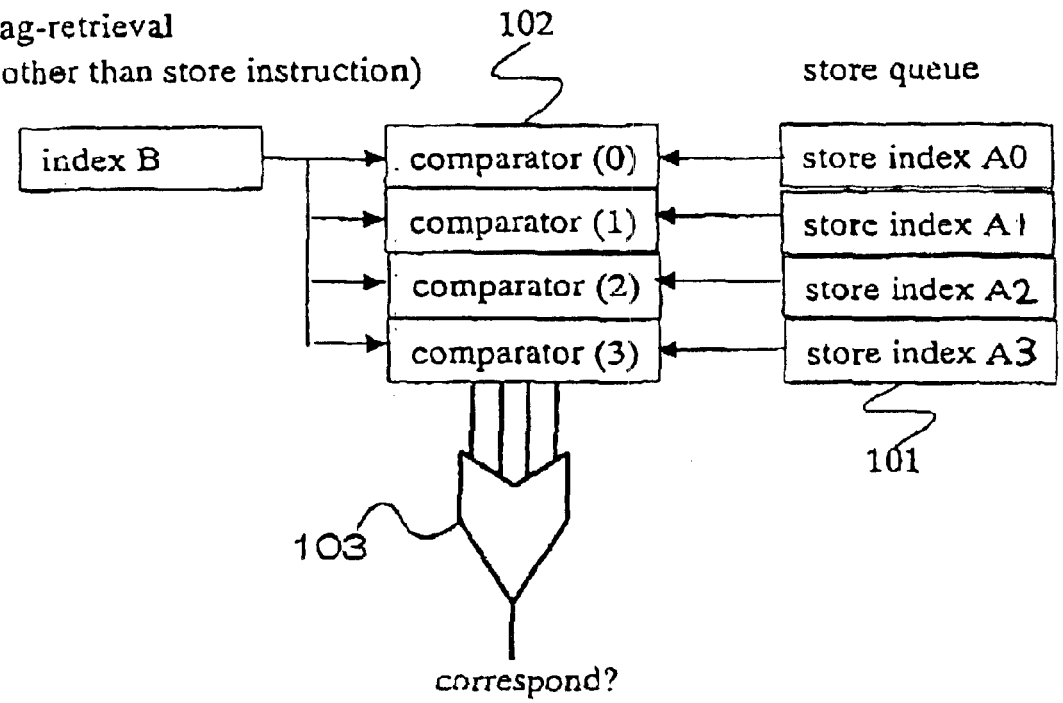
FIG. 2 is a block diagram illustrative of a conventional circuit configuration for detecting the presence of dependency.

A first aspect of the present invention is a circuit for controlling a cache system having a store queue having plural stages for storing store instructions. The circuit includes: a first comparator circuit for comparing, in view of index and off-set, an instruction with tag-retrieval to the store instructions stored in the store queue; and a stalling circuit for selectively stalling the instruction with tag-retrieval if the instruction with tag-retrieval corresponds, in view of not only index but also off-set, to at least one of the store instructions.

It is also preferable that the stalling circuit does not stall the instruction with tag-retrieval if the instruction with tag-retrieval corresponds, in view of index, to at least one of the store instructions but does not correspond, in view of off-set, to at least one of the store instructions It is also preferable that the stalling circuit does not stall the instruction with tag-retrieval if a subsequent instruction with tag-retrieval to the instruction with tag-retrieval corresponds, in view of index, to at least one of the store instructions.

It is also preferable to further comprise: a second comparator circuit for comparing, in view of index and way, the instruction with tag-retrieval to the store instructions stored in the store queue; a executing unit for executing the store instructions in the store queue; and a replacing unit for replacing two instructions in order, and wherein the stalling circuit does not stall the instruction with tag-retrieval if a subsequent instruction with tag-retrieval to the instruction with tag-retrieval corresponds, in view of index, to at least one of the store instructions, and wherein if the instruction with tag-retrieval has a cache-miss and if the instruction with tag-retrieval corresponds, in view of index and way, to at least one of the store instructions, then the executing unit executes the store instructions in the store queue prior to replace process by the replacing unit.

It is also preferable that if a subsequent instruction with tag-retrieval to the instruction with tag-retrieval corresponds, in view of index and off-set, to the store instruction, then the stalling circuit stalls the instruction with tag-retrieval.

It is also preferable that the subsequent instruction with tag-retrieval is a load instruction.

It is also preferable that if the instruction with tag-retrieval is a store instruction and has a cache-miss and if the instruction with tag-retrieval corresponds, in view of index and way, to at least one of the store instructions, then the executing unit executes the store instructions in the store queue prior to storing the instruction with tag-retrieval into the store queue.

It is also preferable that the first comparator circuit comprises an index match detecting unit, and the second comparator circuit comprises a store queue hit detecting unit.

It is also preferable that the cache system has a data cache structure including plural ways.

A second aspect of the present invention is a circuit for controlling a cache system having a store queue having plural stages for storing store instructions. The circuit includes: a first comparator circuit for comparing, in view of index and off-set, a subsequent instruction with tag-retrieval, which is not of store instruction, to the store instructions stored in the store queue; and a stalling circuit for selectively stalling the instruction with tag-retrieval if the subsequent instruction with tag-retrieval corresponds, in view of not only index but also off-set, to at least one of the store instructions.

A third aspect of the present invention is a circuit for controlling a cache system having a store queue having plural stages for storing store instructions. The circuit includes: a first comparator circuit for comparing, in view of index and off-set, a subsequent instruction with tag-retrieval, which is not of store instruction, to the store instructions stored in the store queue; a second comparator circuit for comparing, in view of index and way, the subsequent instruction with tag-retrieval to the store instructions stored in the store queue; and a stalling circuit for selectively stalling the subsequent instruction with tag-retrieval if the instruction with tag-retrieval corresponds, in view of at least one set of a first set of index and off-set and a second set of index and way, to at least one of the store instructions.

A fourth aspect of the present invention is a method for controlling a cache system having a store queue having plural stages for storing store instructions. The method includes: comparing, in view of index and off-set, an instruction with tag-retrieval to the store instructions stored in the store queue; and selectively stalling the instruction with tag-retrieval if the instruction with tag-retrieval corresponds, in view of not only index but also off-set, to at least one of the store instructions.

It is also preferable that the instruction with tag-retrieval is not stalled if the instruction with tag-retrieval corresponds, in view of index, to at least one of the store instructions but does not correspond, in view of off-set, to at least one of the store instructions It is also preferable that the instruction with tag-retrieval is not stalled if a subsequent instruction with tag-retrieval to the instruction with tag-retrieval corresponds, in view of index, to at least one of the store instructions.

It is also preferable to further comprise: comparing, in view of index and way, the instruction with tag-retrieval to the store instructions stored in the store queue; executing the store instructions in the store queue; and replacing two instructions in order, and wherein the instruction with tag-retrieval is not stalled if a subsequent instruction with tag-retrieval to the instruction with tag-retrieval corresponds, in view of index, to at least one of the store instructions, and wherein if the instruction with tag-retrieval has a cache-miss and if the instruction with tag-retrieval corresponds, in view of index and way, to at least one of the store instructions, then the store instructions in the store queue are executed prior to replace process by the replacing unit.

It is also preferable that if a subsequent instruction with tag-retrieval to the instruction with tag-retrieval corresponds, in view of index and off-set, to the store instruction, then the instruction with tag-retrieval is stalled.

It is also preferable that the subsequent instruction with tag-retrieval is a load instruction.

It is also preferable that if the instruction with tag-retrieval is a store instruction and has a cache-miss and if the instruction with tag-retrieval corresponds, in view of index and way, to at least one of the store instructions, then the store instructions in the store queue are executed prior to storing the instruction with tag-retrieval into the store queue.

It is also preferable that the cache system has a data cache structure including plural ways.

A fifth aspect of the present invention is a method for controlling a cache system having a store queue having plural stages for storing store instructions. The method includes: comparing, in view of index and off-set, a subsequent instruction with tag-retrieval, which is not of store instruction, to the store instructions stored in the store queue; and selectively stalling the instruction with tag-retrieval if the subsequent instruction with tag-retrieval corresponds, in view of not only index but also off-set, to at least one of the store instructions.

A fifth aspect of the present invention is a method for controlling a cache system having a store queue having plural stages for storing store instructions, the method including: comparing, in view of index and off-set, a subsequent instruction with tag-retrieval, which is not of store instruction, to the store instructions stored in the store queue; further comparing, in view of index and way, the subsequent instruction with tag-retrieval to the store instructions stored in the store queue; and selectively stalling the subsequent instruction with tag-retrieval if the instruction with tag-retrieval corresponds, in view of at least one set of a first set of index and off-set and a second set of index and way, to at least one of the store instructions.

First Embodiment

Figure 6:
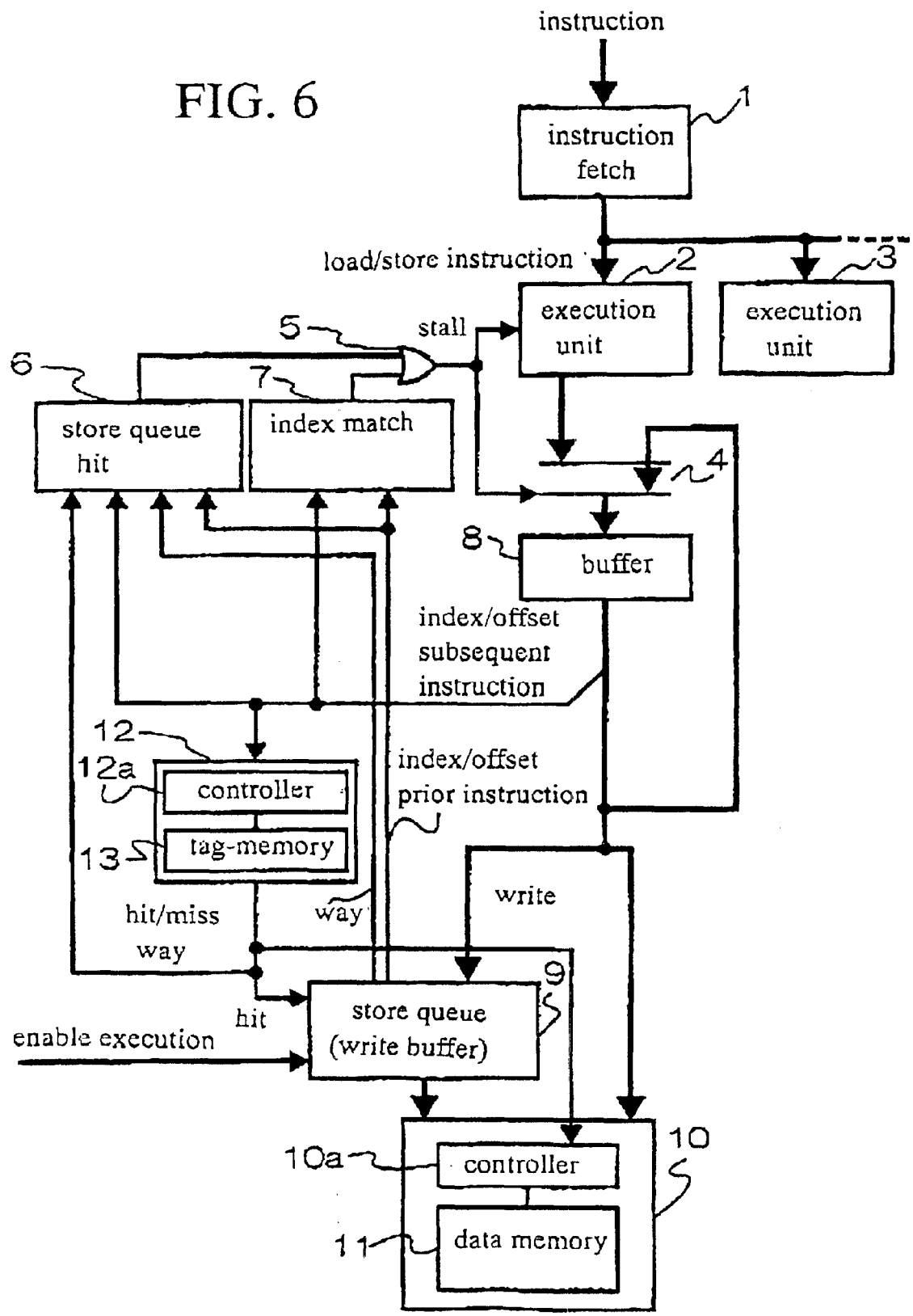
FIG. 6 is a block diagram illustrative of a novel cache system control circuit in a first embodiment in accordance with the present invention.

A first embodiment according to the present invention will be described in detail with reference to the drawings. FIG. 6 is a block diagram illustrative of a novel cache system control circuit in a first embodiment in accordance with the present invention. Most significant structural features of the present invention may be in connection with a first stall detection with reference to store queue hit and a second stall detection with reference to index match. The novel cache system control circuit includes the following structural elements.

An instruction fetch 1 sequentially fetches instructions for supplying the fetched instructions to plural execution units 2, 3, - - -, respectively. Each of the plural execution units 2, 3, - - -, executes the load instruction and the store instruction. If a stall signal instructing a stall state from an OR-gate 5 is inactivated, then the execution unit 2 decodes the load instruction or the store instruction, thereby obtaining address offset and index signals. The execution unit 2 supplies the address offset and index signals to a first input terminal of a selector 4. If the stall signal is inactivated, then the selector 4 selects the output from the execution unit 2 and supplies the same to a buffer 8. An output from the buffer 8 is supplied to a second input terminal of the selector 4. If the stall signal from the OR-gate 5 is activated, then the selector 4 selects the output and feeds the output back to the buffer 8.

For avoiding complicated descriptions, it is assumed that the instructions executed by the execution unit 2 are limited to the load instruction or the store instruction which are to be stored in the data cache and which are executed for data load and store operations between internal registers and either the data memory of the data cache or the main memory. Notwithstanding, the present invention is applicable to any instructions with tag-retrievals.

The OR-gate 5 has two input terminals which receive outputs from a first stall detector 6 with reference to the store queue hit and a second stall detector 7 with reference to the index match. The OR-gate 5 takes logical OR operation of those outputs from the first and second stall detectors 6 and 7. The first stall detector 6 compares index and way between a subsequent instruction from the buffer 8 and each instruction stored in a store queue 9. If any correspondence can be confirmed between them, the first stall detector 6 activates a correspondence signal as an output signal. If no correspondence can be confirmed between them, the first stall detector 6 inactivates the correspondence signal. The second stall detector 7 compares index and off-set between the subsequent instruction from the buffer 8 and the each instruction stored in the store queue 9 unless the subsequent instruction is the store instruction. If any correspondence can be confirmed between them, the second stall detector 7 activates a correspondence signal as an output signal. If no correspondence can be confirmed between them, the second stall detector 7 inactivates the correspondence signal.

A tag memory control unit 12 comprises a controller 12a and a tag memory 13. The tag memory control unit 12 constitutes a data cache in co-operation with a data memory control unit 10. The controller 12a has a main function for controlling access to the tag memory 13. The tag memory control unit 12 receives inputs of an index of a subsequent instruction with the tag-retrieval and an off-set and a page frame number, and confirms whether the page frame number has been stored in an retrieval-object index (hit) or the page frame number has not been stored in the retrieval-object index (miss) for output of retrieval result "hit" or "miss". If the retrieval result is "hit", then the tag memory control unit 12 also outputs the hit way and the page frame number. If the retrieval result is "miss", then the tag memory control unit 12 also outputs a "replace-object way" to be replaced and the page frame number.

The store queue 9 has plural stage memory areas, each of which is capable of storing a set of an address and data for a tag-retrieved store instruction from the buffer 8, and the page frame number from the tag memory 13 as well as way. The store queue 9 performs the store operation of the stored information therein upon receipt of an execution-enabling signal from the processor which is not illustrated in FIG. 6.

A data memory control unit 10 comprises a controller 10a and a data memory 11 acting as a data cache. The controller 10a has a main function to control "write-back operation" and "refill operation" and also control access to a data memory 11. The controller 10a of the data memory control unit 10 controls the "write-back operation" and "refill operation" based on the output from the tag memory control unit 12, as well as execute read/write operations to the data memory 11 and the main memory not illustrated, based on a read request directly supplied from the buffer 8 and a write request supplied from the store queue 9.

Figure 3:
FIG. 3 is a diagram illustrative of an address data configuration for access to the main memory or the data memory.
Figure 4:
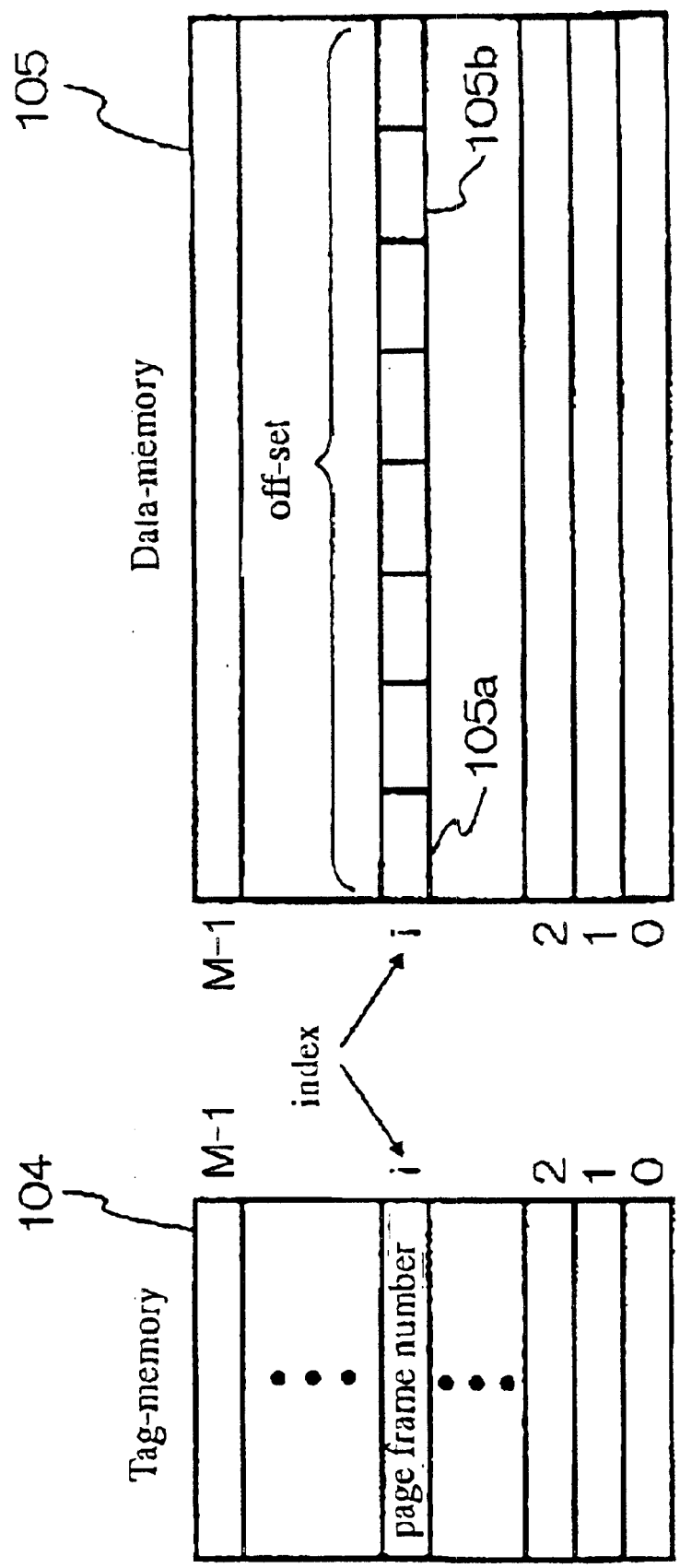
FIG. 4 is a block diagram illustrative of a fragmentary data cache structure including a tag memory and a data memory in one-way.
Figure 5:
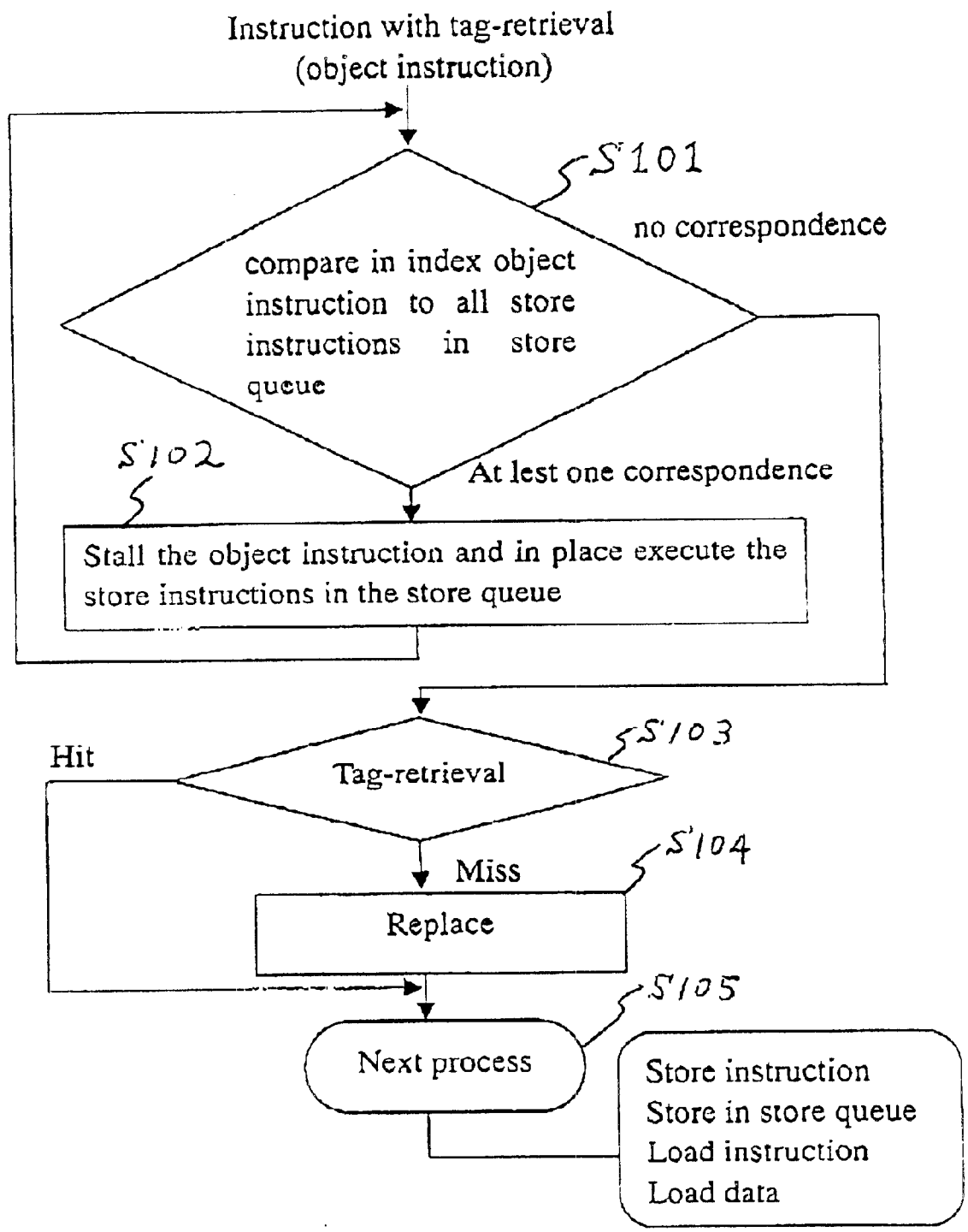
FIG. 5 is a flow chart of sequential processes in accordance with instructions with the needs to retrieve tags for using data caches thereof, in connection with the structure of FIG. 2.
Figure 7:
FIG. 7 is a block diagram illustrative of an example of the structure of the store queue shown in FIG. 6.

FIG. 7 is a block diagram illustrative of an example of the structure of the store queue shown in FIG. 6. The store queue 9 has plural stage memory areas which are allocated with identification codes (ID), "0", "1", "2", - - - "n−1". Each of the plural stage memory areas stores an address and data of the store instruction, provided that the page frame number, the index, the off-set and the way are illustrated, but the illustration of data is omitted. The page frame number, the index, and the off-set correspond to what is shown in FIG. 3. The way has a value which indicates which way is taken by the each store instruction, provided that the data cache structure has plural ways. If the data cache has a way "0" and a way "1", then the way has either "0" corresponding to the way "0" or "1" corresponding to the way "1".

Figure 8:
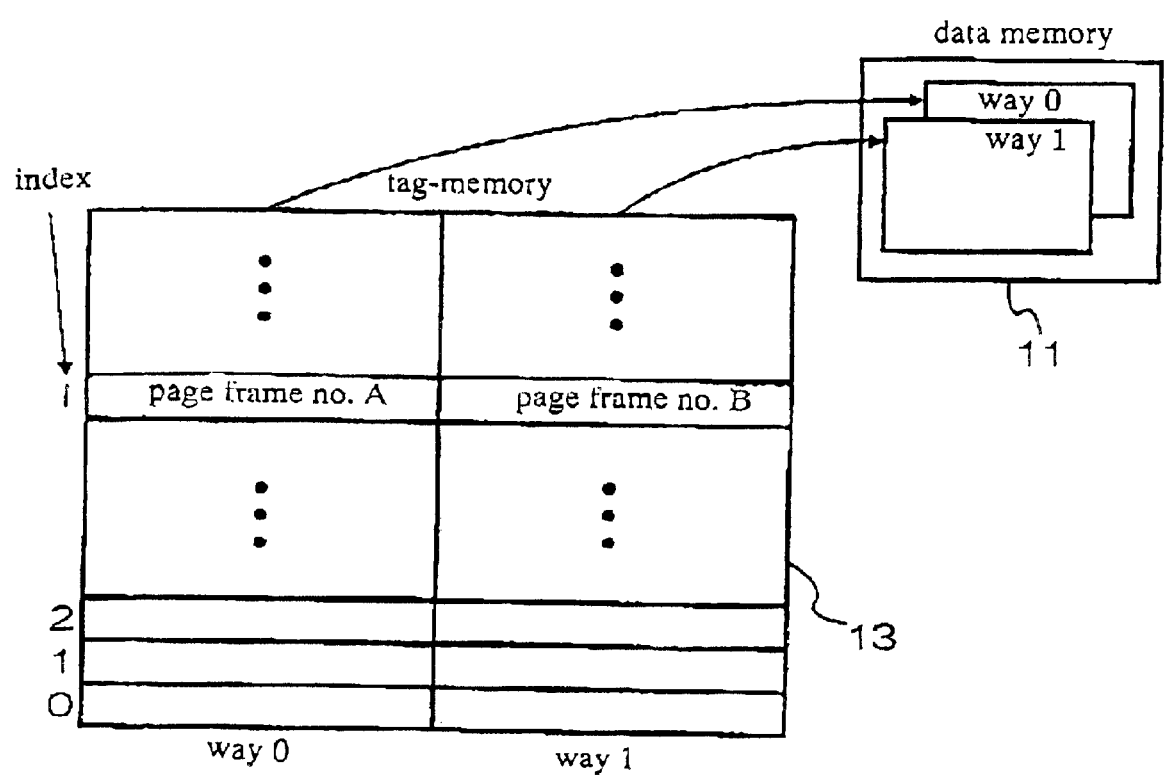
FIG. 8 is a block diagram illustrative of an example of the structure of the data memory shown in FIG. 6.

FIG. 8 is a block diagram illustrative of an example of the structure of the data memory shown in FIG. 6. It is assumed that the data cache has the way "0" and the way "1", and each of the tag memory 13 and the data memory 11 has two way areas for the two ways. Each of the two way areas for the two ways is further divided into plural sub-areas for respectively storing respective page frame numbers for the two ways. The plural sub-areas are allocated with common indexes "0", "1", "2", - - - "i", - - - to the two way areas, the way "0" and the way "1". In this case, the number of ways is only 2, but 4-ways or 8ways are of course available.

Figure 9:
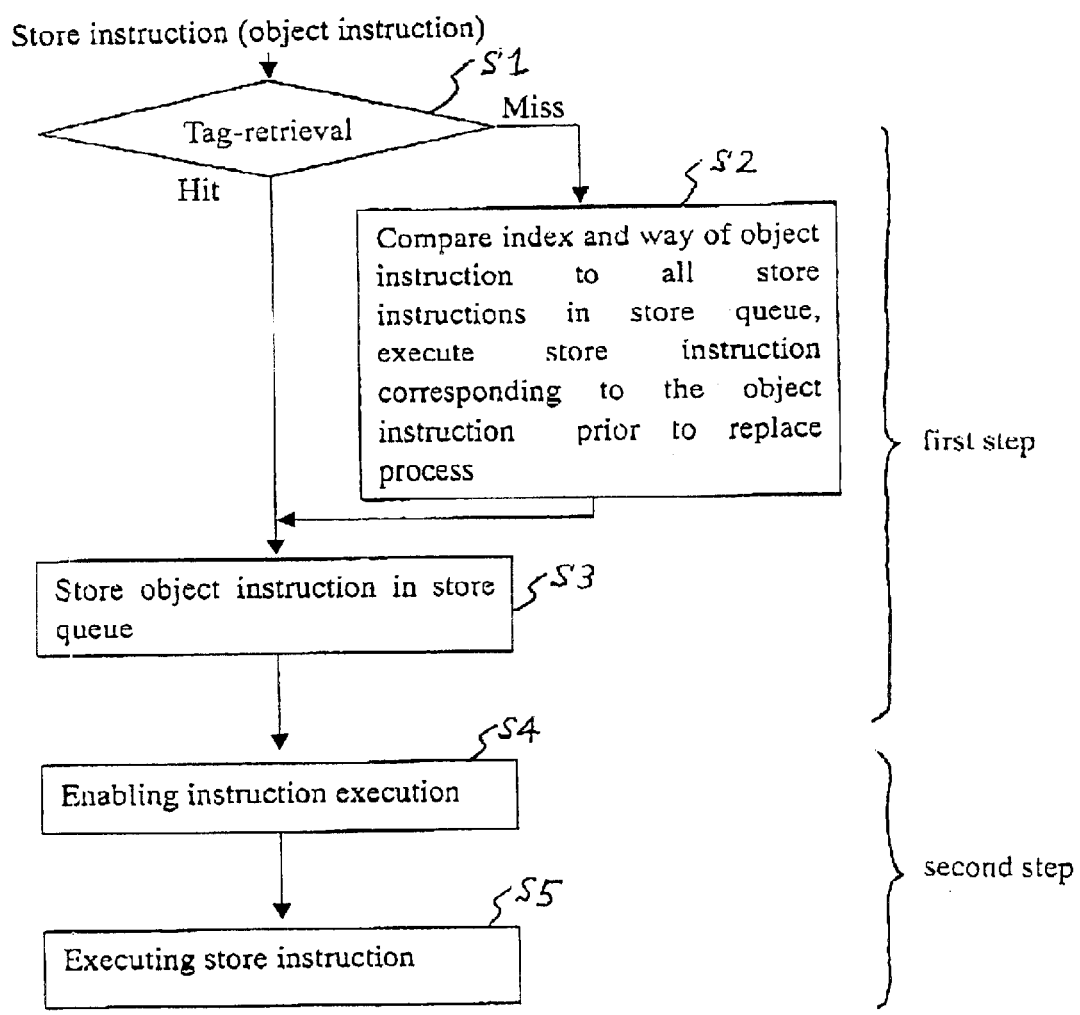
FIG. 9 is a flow chart illustrative of the process for store instruction by the novel structure of FIG. 6.
Figure 10:
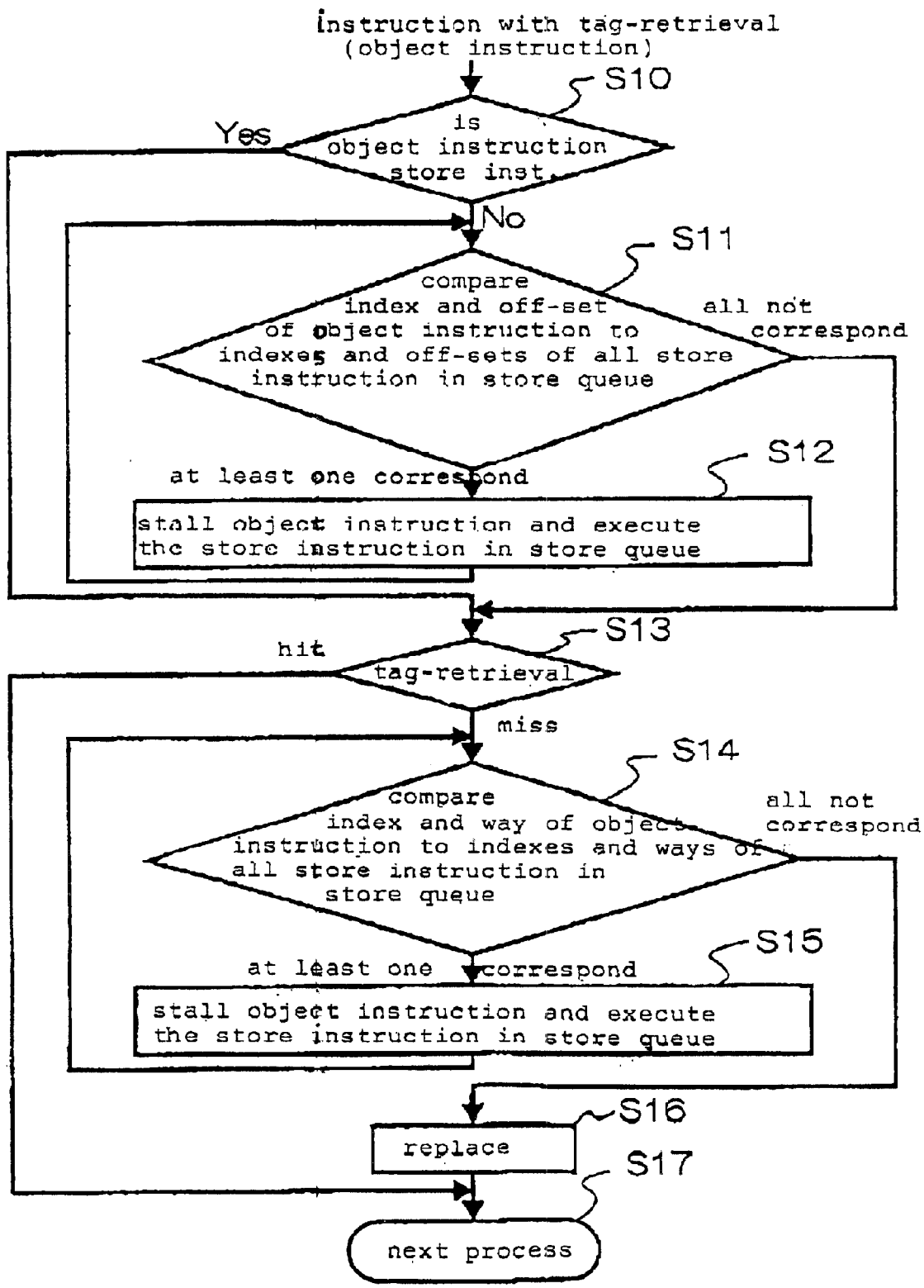
FIG. 10 is a flow chart illustrative of the process for the instruction with the tag retrieval by the novel structure of FIG. 6.

FIG. 9 is a flow chart illustrative of the process for store instruction by the novel structure of FIG. 6. FIG. 10 is a flow chart illustrative of the process for the instruction with the tag retrieval by the novel structure of FIG. 6. As described above, the instruction with the tag-retrieval has been defined to be the instruction needing the tag retrieval such as the load instruction, the pre-fetch instruction and the store instruction, for which reason the flow chart of FIG.10 includes the process for the store instruction of FIG. 9.

With reference to FIG. 9, the process for the store instruction will be described. For processing the store instruction, it is verified whether or not the tag retrieval is stored in the tag memory control unit 12, for example, whether the corresponding page frame number has been stored in the retrieval-object index (hit) or has not been stored (miss), and output a result "hit" or "miss" in the step S1. If the corresponding page frame number has not been stored in the retrieval-object index (miss), then the tag memory 13 selects one of the two ways of the write-object indexes of the object store instruction by a replacement algorithm such as Least Recently Used (LRU). The selected index and way of the object store instruction is compared to the indexes and ways of all the store instructions in the store queue 9. If any store instructions in the store queue 9 have the correspondence to the selected index and way of the object store instruction, then all of the store instructions with the correspondences are executed, before the replace process is then executed to the page frame number stored in the tag memory 13, and data stored in the data memory 11, whereby the object store instruction is placed into the hit-state in the step S2, so that the object store instruction in the hit state is stored in the store queue 9 in the step S3. Those processes are the first step of the store instruction execution flow.

After the above first step has been completed, the process enters into the second step, wherein the store instruction stored in the store queue 9 is actually executed. In the second step, after the data become storable in accordance with the operational states of the main memory and the data cache, then an input of an execution-enable signal appears, and execution enable conditions are satisfied (OK), before the execution of the store instruction starts in the step S4. If the execution enable conditions are satisfied (OK), then the store instruction stored in the store queue 9 is executed, whereby data are written into the data memory 11 in the step S5, wherein respective execution enable signals are generated to respective store instructions separately.

Subsequently, the flow chart of FIG. 10 will be described. The step S13 in FIG. 10 corresponds to the step S1 in FIG. 9. The sequential steps S14–S16 in FIG. 10 respectively correspond to the step S2 in FIG. 9. The step S17 and subsequent steps in FIG. 10 respectively correspond to the steps S3, S4 and S5 in FIG. 9. In FIG. 10, if the instruction with the tag-retrieval is outputted from the buffer 8, then this instruction is the object instruction. It is verified whether the object instruction is the store instruction in the step S10. If the object instruction is not the store instruction, then the first stall detector 7 verifies whether or not at least one store instruction identical in the index and off-set with the object instruction has been stored in the store queue 9 in the step S11. If at least one store instruction identical in the index and off-set with the object instruction has been stored in the store queue 9, then the object instruction is placed into the stall state, whereby the store or load operation by the object instruction is stalled, and the store instructions stored in the store queue 9 are executed in the step S12 until the stall request has been canceled.

If any one store instruction identical in the index and off-set with the object instruction has not been stored in the store queue 9 or if the object instruction is the store instruction, then the tag memory control unit 12 performs the tag-retrieval in the step S13. If the result of the tag-retrieval is hit, then the next process will be executed in the step S17.

In accordance with this embodiment, if the instruction with the tag-retrieval is outputted from the buffer 8, and the store instruction is stored in the store queue 9, then the read operation is prior executed by the instruction with the tag-retrieval. As described with reference to FIG. 9, the cache hit is ensured to the store instruction to be stored in the store queue 9. In case that the tag-retrieval result to the instruction with the tag-retrieval is "miss", if the replace process is merely executed in the data cache, then cache data, for example, data in the tag memory 13 and the data memory 11 for the store instruction with the guarantee of the cache hit may be replaced. Namely, the page frame number for the store instruction is incorrect. In order to avoid this trouble, in accordance with the present invention, prior to executing the replace process against the "miss" tag-retrieval result, it is verified whether or not the replace process is to replace the cache data for the store instruction in the store queue 9. If the replace process is to replace the cache data for the store instruction in the store queue 9, then the store process by the store instruction is prior executed. For example, in the step S14, the index and way as the replace objects of the object instruction designated by the tag memory control unit 12 are compared to the indexes and ways of all the store instructions in the store queue 9. If all store instructions stored in the store queue 9 have no correspondence in the index and way to the object instruction, then the replace process is merely executed in the step S16. If at least one store instruction stored in the store queue 9 has the correspondence in the index and way to the object instruction, then the store operations by the store instructions in the store queue 9 are prior executed in the step S15, and then back to the step S14. If at least one store instruction has the correspondence in the index and way to the object instruction, then the store operations by the store instructions in the store queue 9 are prior executed in the step S15, until all of the store instruction stored in the store queue 9 have no correspondence in the index and way to the object instruction. if all of the store instruction stored in the store queue 9 have no correspondence in the index and way to the object instruction, then the replace process is executed in the step S16.

As a result of the above processes, the prior execution of the instruction with the tag-retrieval is allowed with ensuring the cache hit to the store instruction in the store queue 9. After the replace process in the step S16 has been executed, then the process in the step S17 is executed.

Figure 11:
FIG. 11 is a diagram illustrative of respective operations of the first stall detector, the store queue and the tag memory for execution of the instruction with the tag-retrieval.

FIG. 11 is a diagram illustrative of respective operations of the first stall detector, the store queue and the tag memory for execution of the instruction with the tag-retrieval. It is assumed that "page frame number A" is stored at the index "i" and the way "0" in the tag memory 13, and "page frame number B" is stored at the index "i" and the way "1" in the tag memory 13. In the store queue 9, at the ID=1, "page frame number B" is stored on the page frame number, and "i" is stored on the index and "x" is stored on the off-set, and "1" is stored on the way. At the ID=2, "page frame number A" is stored on the page frame number, and "i" is stored on the index and "y" is stored on the off-set, and "0" is stored on the way.

If the page frame number "C", the index "i" and the off-set "z" are entered as data to be subject to the tag-retrieval in the step S13 in FIG. 10, then the page frame number "A" at the index "i" in the tag memory 13 is not the page frame number "C", and also the page frame number "B" at the index "i" in the tag memory 13 is not the page frame number "C". The tag-result is "miss". It is assumed that the "way=1" is determined through the LRU in the tag memory control unit 12. In this case, the index "i" of the instruction with the tag-retrieval and the way "1" as the replace object are compared by the first stall detector 6 to the indexes and ways at the ID=0~n−1. In this example, ID=1 of the store queue 9 has the correspondence, and enters into the store queue hit state. In the step S15, the store instruction at ID=1 is executed before the replace process is then executed in the step S16.

Figure 12:
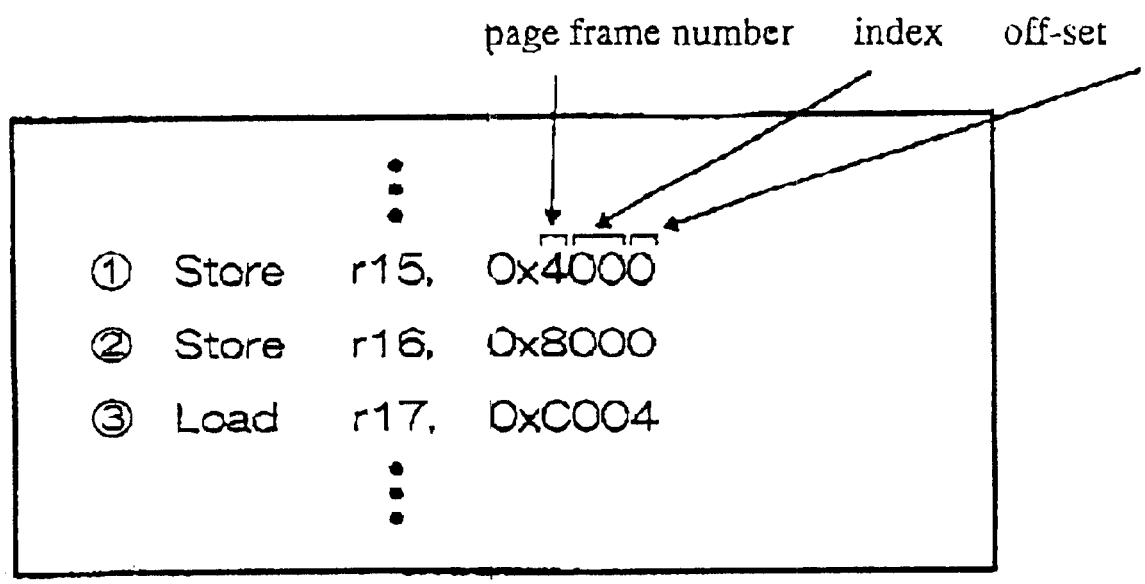
FIG. 12 is a view illustrative of an example of the instruction sequence.

FIG. 12 is a view illustrative of an example of the instruction sequence. FIG. 13 is a view illustrative of operations upon input of the instruction sequence of FIG. 12. FIG. 13 shows the type of the instruction, for example, store or load instruction, the value of way subject to the replace and respective page frame numbers stored on the way "0" and the way "1" at the index "0" of the tag memory 13, as well as comparison results "0" (miss) and "1" (hit) by the first stall detector 6. In FIG. 12, it is assumed that the higher significant four bits represent the page frame number, the intermediate significant eight bits represent the index and the lower significant four bits represent the off-set.

In the initial state, the page frame number is "indefinite" on the way "0" at the index "0", and the page frame number is "8" on the way "1" at the index "0" in the tag memory 13. The store instruction has not been stored in the store queue 9. The store instruction (1) is executed in the step "a". The store instruction (1) has the page frame number "4", the index "00" and off-set "0". The tag retrieval is executed by verifying whether or not the page frame number "4" is stored in the area corresponding to the index "00" of the tag memory 13. The result of the tag-retrieval is "miss". No store instruction is stored in the store queue. The replace process is then executed in the step "b", provided that the way "0" is designated for the replace object. As a result of the replace process, "4" and "8" are stored on the ways "0" and "1" respectively at the index "00" of the tag memory 13. The store instruction (1) is stored in the store queue 9.

The store instruction (2) is executed in the step "c". The store instruction (2) has the page frame number "8", the index "00" and off-set "0". The tag retrieval is executed by verifying whether or not the page frame number "8" is stored in the area corresponding to the index "00" of the tag memory 13. The result of the tag-retrieval is "hit" (way 1). The store instruction (2) is stored in the store queue 9.

The load instruction (3) is executed in the step "d". The load instruction (3) has the page frame number "C", the index "00" and off-set "4". In this case, both the store instructions (1) and (2) stored in the store queue 9 have the index "00" and the off-set "0". The results in the steps S11 in FIG. 10 are "all have no correspondence". The tag-retrieval in the step S13 in FIG. 10 is then executed. In this case, the page frame number "C" is not stored in the index "00" of the tag memory 13, whereby the tag-retrieval result is "miss". The process of the step S14 in FIG. 10 is then executed, provided that the way "0" is designated as the replace object to the load instruction (3). In this case, the index "00" and the way "0" are the replace object to the load instruction (3). The load instruction (3) is identical with the store instruction (1) in the store queue 9 in the index and way. The result of the step S14 in FIG. 10 is "at least one has correspondence" or "store queue hit state", whereby the process of the step S15 is executed. In this case, the store instruction (1) is executed to write data in the step "e". In this example, only the store instruction (1) is the object instruction in the step Sl5 of FIG. 10. After the store instruction has been completed, then the replace process of the step S16 is executed, whereby the page frame number "C" is stored on the way "0" at the index "00" in the tag memory 13 in the step "f".

FIG. 14A is a view illustrative of examples of the instructions which are stalled by comparison of the index and off-set, wherein there is a data dependency with correspondences in index, off-set and page frame number. FIG. 14B is a view illustrative of examples of the instructions which are stalled by comparison of the index and off-set, wherein there is no data dependency with correspondences in index, off-set and page frame number. FIG. 15A is a view illustrative of examples of the instructions which are not stalled by comparison of the index and off-set, wherein there is no correspondence in index. FIG. 15B is a view illustrative of examples of the instructions which are not stalled by comparison of the index and off-set, wherein there is correspondence in index and no correspondence in off-set, (store queue hit may be possible). In FIGS. 14A, 14B, 15A and 15B, it is assumed that the higher significant four bits represent the page frame number, the intermediate significant eight bits represent the index and the lower significant four bits represent the off-set.

The following modifications to the above embodiment may optionally be available. The above first and second stall detectors may comprise a single stall detector unit which has both the functions of the first and second stall detectors. The controller 10a of the data memory control unit 10 and the controller 12a of the tag memory control unit 12 may comprise a single control unit which has both the functions of the controllers 10a and 12a. The execution unit 2 may comprise separate two execution units for executing the load instruction and the store instruction respectively.

Accordingly, an instruction with tag-retrieval is compared, in view of index and off-set, to the store instructions stored in the store queue for selectively stalling the instruction with tag-retrieval if the instruction with tag-retrieval corresponds, in view of not only index but also off-set, to at least one of the store instructions. This suppresses generation of unnecessary stall states for promoting re-order in connection with data cache and improving performance and throughput of the microprocessor.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A control circuit for controlling a cache system having a store queue for storing at least one store instruction, said control circuit including:
   a first comparator circuit comparing, in view of an index and an off-set, an object instruction with tag-retrieval to said at least one store instruction stored in said store queue, and said first comparator circuit outputting a first stall signal for stalling said object instruction with tag-retrieval if said object instruction with tag-retrieval corresponds, in view of said index and said off-set, to at least any one of said at least one store instruction stored in said store queue;
   a second comparator circuit comparing, in view of an index and a way, said object instruction with tag-retrieval to said at least one store instruction stored in said store queue, and said second comparator circuit outputting a second stall signal for stalling said object instruction with tag-retrieval if said object instruction with tag-retrieval corresponds, in view of said index and said way, to at least any one of said at least one store instruction stored in said store queue; and
   a controller circuit stalling, in accordance with said first stall signal, said object instruction with tag-retrieval and executing said store instruction, which corresponds, in view of said index and said off-set, to said object instruction with tag-retrieval; and
   said controller circuit also stalling, in accordance with said second stall signal, said object instruction with tag-retrieval and executing said store instruction, which corresponds, in view of said way to said object instruction with tag-retrieval and subsequently said controller circuit replacing a cache.

2. The control circuit as claimed in claim 1,
   wherein said first comparator circuit does not output said first stall signal if said object instruction with tag-retrieval corresponds, in view of said index only to said at least one store instruction, and said controller circuit does not stall said object instruction with tag-retrieval, and
   wherein said second comparator circuit does not output said second stall signal if said object instruction with tag-retrieval corresponds, in view of said index only to said at least one store instruction, and said controller circuit does not stall said object instruction with tag-retrieval, and does not replace said cache.

3. The control circuit as claimed in claim 1,
   wherein said first comparator circuit does not output said first stall signal if a subsequent object instruction with tag-retrieval to said object instruction with tag-retrieval corresponds, in view of said index, to at least any one of said at least one store instruction stored in said store queue, and said controller circuit does not stall said object instruction with tag-retrieval,
   wherein said second comparator circuit does not output said second stall signal if said subsequent object instruction with tag-retrieval corresponds, in view of said index, to at least any one of said at least one store instruction stored in said store queue, and said controller circuit does not stall said object instruction with tag-retrieval, and does not replace said cache,
   wherein said first comparator circuit outputs said first stall signal if a subsequent object instruction with tag-retrieval to said object instruction with tag-retrieval corresponds, in view of index and said off-set, to at least any one of said at least one store instruction stored in said store queue, and said controller circuit stalls said object instruction with tag-retrieval, and
   wherein said second comparator circuit outputs said second stall signal if said subsequent object instruction with tag-retrieval corresponds, in view of said index and said way, to at least any one of said at least one store instruction stored in said store queue, and said controller circuit stalls said object instruction with tag-retrieval, and replaces said cache.

4. The control circuit as claimed in claim 3, wherein said subsequent object instruction with tag-retrieval is a load instruction.

5. The control circuit as claimed in claim 1, wherein said control circuit executes said at least one store instruction in said store queue prior to storing said object instruction with tag-retrieval into said store queue, if said object instruction with tag-retrieval is a store instruction and has a cache-miss and if said object instruction with tag-retrieval corresponds, in view of index and way, to at least any one of said at least one store instruction.

6. The control circuit as claimed in claim 1, wherein said first comparator circuit comprises an index match detecting unit, and said second comparator circuit comprises a store queue hit detecting unit.

7. The control circuit as claimed in claim 1, wherein said cache system has a data cache structure including plural ways.

8. The control circuit as claimed in claim 1,
   wherein said first comparator circuit compares, in view of said index and said off-set, a subsequent object instruction with tag-retrieval, which is not of store instruction, to said at least one store instruction stored in said store queue, and said first comparator circuit outputs said first stall signal for stalling said subsequent object instruction with tag-retrieval if said subsequent object instruction with tag-retrieval corresponds, in view of said index and said off-set, to at least any one of said at least one store instruction stored in said store queue;
   wherein said second comparator circuit compares, in view of said index and said way, said subsequent object instruction with tag-retrieval to said at least one store instruction stored in said store queue, and said second comparator circuit outputs said second stall signal for stalling said subsequent object instruction with tag-retrieval if said subsequent object instruction with tag-retrieval corresponds, in view of said index and said way, to at least any one of said at least one store instruction stored in said store queue;
   wherein said controller circuit stalls, in accordance with said first stall signal, said subsequent object instruction with tag-retrieval and executing said store instruction, which corresponds, in view of said index and said off-set, to said subsequent object instruction with tag-retrieval, and
   said controller circuit also stalls, in accordance with said second stall signal, said subsequent object instruction with tag-retrieval and executing said store instruction, which corresponds, in view of said way to said subsequent object instruction with tag-retrieval and subsequently said controller circuit replaces said cache.

9. A method of controlling a cache system having a store queue for storing at least one store instruction, said method including:

comparing, in view of an index and off-set, an object instruction with tag-retrieval to said at least one store instruction stored in said store queue;

outputting a first stall signal for stalling said object instruction with tag-retrieval if said object instruction with tag-retrieval corresponds, in view of said index and said off-set, to at least any one of said at least one store instruction stored in said store queue;

comparing, in view of an index and a way, said object instruction with tag-retrieval to said at least one store instruction stored in said store queue;

outputting a second stall signal for stalling said object instruction with tag-retrieval if said object instruction with tag-retrieval corresponds, in view of said index and said way, to at least any one of said at least one store instruction stored in said store queue;

stalling, in accordance with said first stall signal, said object instruction with tag-retrieval and executing said store instruction, which corresponds, in view of said index and said off-set, to said object instruction with tag-retrieval; and stalling, in accordance with said second stall signal, said object instruction with tag-retrieval and executing said store instruction, which corresponds, in view of said way to said object instruction with tag-retrieval and subsequently replacing a cache.

10. The method as claimed in claim 9, wherein said first stall signal is not outputted if said object instruction with tag-retrieval corresponds, in view of said index only to said at least one store instruction, and said object instruction with tag-retrieval is not stalled, and wherein said second stall signal is not outputted if said object instruction with tag-retrieval corresponds, in view of said index only to said at least one store instruction, and said object instruction with tag-retrieval is not stalled, and said cache is not replaced.

11. The method as claimed in claim 9, wherein said first stall signal is not outputted if a subsequent object instruction with tag-retrieval to said object instruction with tag-retrieval corresponds, in view of said index, to at least any one of said at least one store instruction stored in said store queue, and said object instruction with tag-retrieval is not stalled, wherein said second stall signal is not outputted if said subsequent object instruction with tag-retrieval corresponds, in view of said index, to at least any one of said at least one store instruction stored in said store queue, and said object instruction with tag-retrieval is not stalled, and said cache is not replaced, wherein said first stall signal is outputted if a subsequent object instruction with tag-retrieval to said object instruction with tag-retrieval corresponds, in view of index and said off-set, to at least any one of said at least one store instruction stored in said store queue, and said object instruction with tag-retrieval is stalled, and wherein said second stall signal is outputted if said subsequent object instruction with tag-retrieval corresponds, in view of said index and said way, to at least any one of said at least one store instruction stored in said store queue, and said object instruction with tag-retrieval is stalled, and said cache is replaced.

12. The method as claimed in claim 11, wherein said subsequent object instruction with tag-retrieval is a load instruction.

13. The method as claimed in claim 9, wherein said at least one store instruction in said store queue is executed prior to storing said object instruction with tag-retrieval into said store queue, if said object instruction with tag-retrieval is a store instruction and has a cache-miss and if said object instruction with tag-retrieval corresponds, in view of index and way, to at least any one of said at least one store instruction.

14. The method as claimed in claim 9, wherein a subsequent object instruction with tag-retrieval, which is not of store instruction, is compared, in view of said index and said off-set, to said at least one store instruction stored in said store queue, and said first stall signal for stalling said subsequent object instruction with tag-retrieval is outputted if said subsequent object instruction with tag-retrieval corresponds, in view of said index and said off-set, to at least any one of said at least one store instruction stored in said store queue;

wherein said subsequent object instruction with tag-retrieval is compared, in view of said index and said way, to said at least one store instruction stored in said store queue, and said second stall signal for stalling said subsequent object instruction with tag-retrieval is outputted if said subsequent object instruction with tag-retrieval corresponds, in view of said index and said way, to at least any one of said at least one store instruction stored in said store queue;

wherein in accordance with said first stall signal, said subsequent object instruction with tag-retrieval is stalled and said store instruction is executed, which corresponds, in view of said index and said off-set, to said subsequent object instruction with tag-retrieval, and wherein in accordance with said second stall signal, said subsequent object instruction with tag-retrieval is stalled and said store instruction is executed, which corresponds, in view of said way, to said subsequent object instruction with tag-retrieval and subsequently said cache is replaced.

\* \* \* \* \*